United States Patent [19]

Wicker

[11] Patent Number: 4,488,704
[45] Date of Patent: Dec. 18, 1984

[54] DUAL CONTROL ACTUATOR FOR VALVES

[75] Inventor: Gordon R. Wicker, Lakewood, Colo.

[73] Assignee: AMAX Inc., Greenwich, Conn.

[21] Appl. No.: 445,891

[22] Filed: Dec. 1, 1982

[51] Int. Cl.³ .............................................. F16K 31/44
[52] U.S. Cl. ................................... 251/265; 251/225; 251/273
[58] Field of Search ............... 251/215, 222, 225, 264, 251/265, 273, 318

[56] References Cited

U.S. PATENT DOCUMENTS

| | | | |
|---|---|---|---|
| 284,635 | 9/1883 | Hitchcock | 251/225 |
| 2,224,231 | 12/1940 | Mohr | 251/264 |
| 2,585,667 | 2/1952 | Meador | 251/273 |
| 2,612,904 | 10/1952 | Richards et al. | 251/225 |

Primary Examiner—A. Michael Chambers
Attorney, Agent, or Firm—Roland T. Bryan

[57] ABSTRACT

A dual valve plug stem actuator device for plug or globe type valves is disclosed wherein said actuator mechanisms provide respectively coarse and fine independent movement of the valve plug stem. One actuating device controls the movement in the axial direction of the valve plug stem relative to and onto a valve seat port by the rotational movement of the threaded valve plug stem through the internal threads of an internally and externally threaded actuator nut. The other of the actuating devices controls the movement of the valve plug stem relative to and onto a valve seat port through the rotation of the internally and externally threaded valve actuator nut where rotation of the actuator nut causes movement in the axial direction of said actuator nut in relation to the stationary valve body and where the axial displacement of the actuator nut causes the same relative axial rotationless displacement of the valve plug.

8 Claims, 1 Drawing Figure

U.S. Patent  Dec. 18, 1984  4,488,704
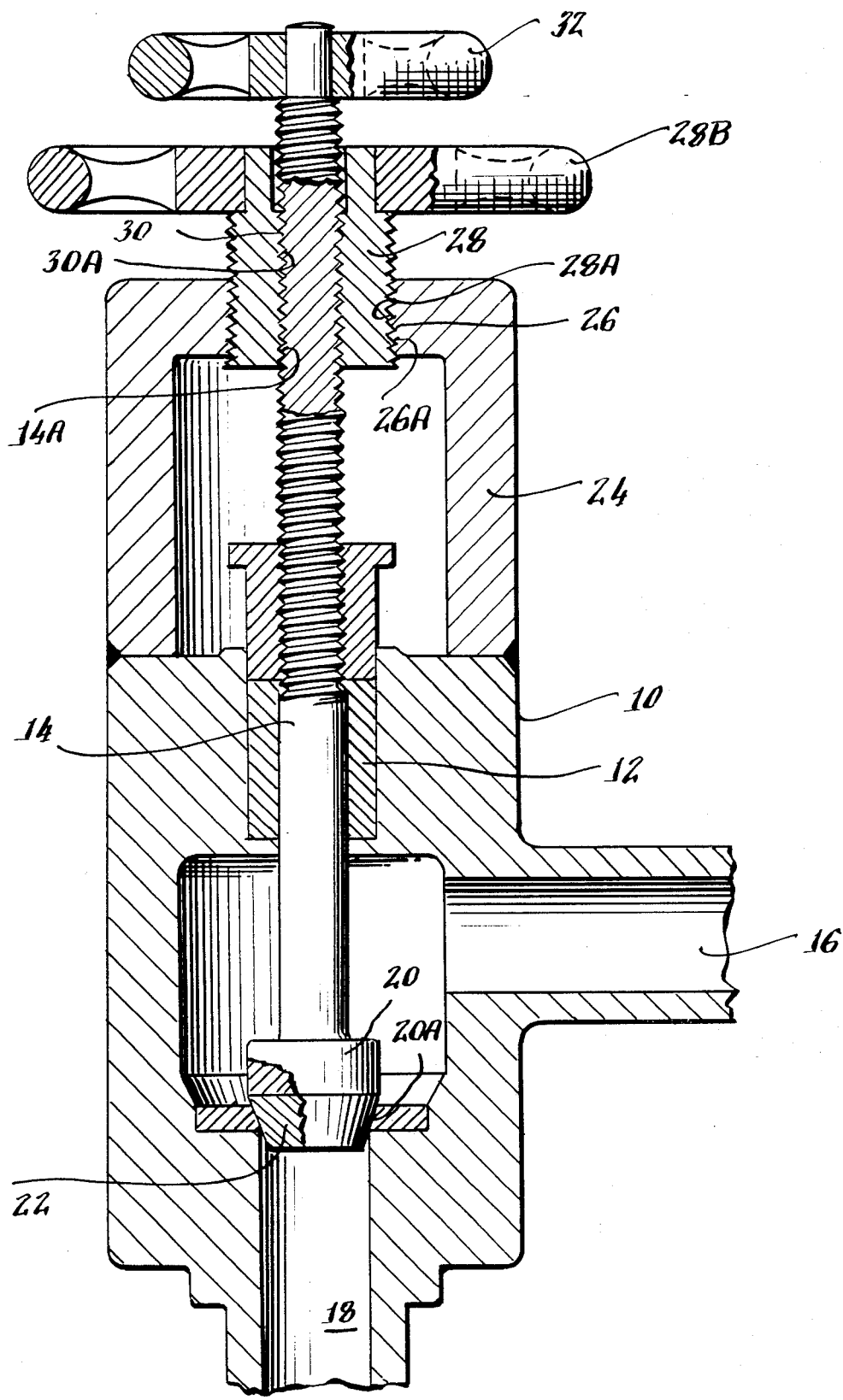

DUAL CONTROL ACTUATOR FOR VALVES

BACKGROUND OF THE INVENTION

This invention relates to actuating devices for plug or globe type valves and more particularly to such valves having a dual actuating device.

It is well known that in the introduction of a pressure loss by a valve within a system, the mode of actuation of said valve is an important design criterion. Heretofore, a variety of valve actuating devices were know including pneumatically operated (diaphragm) actuators, piston (cylinder) actuators, electro-hydraulic actuators, high-performance servo actuators, electro-mechanical actuators, and mechanical screw actuators.

As a type, mechanical screw actuators are the most familiar valve actuator. By rotation, mechanical screw actuators use the threaded mechanical advantage of the screw threads between the valve plug stem and a threaded mounting member of the valve body or between a threaded handle and the threaded valve plug stem to create an axial displacement of the valve plug.

The design of a mechanical screw actuator for a valve depends upon a variety of criteria. The most important of these criteria are the amount of pressure control within the system that is needed, the ability to sacrifice that pressure control for the convenience of actuation, the nature of the fluid to be controlled and the extent to which complete shutoff is required.

The amount of pressure control that can be exerted by mechanical screw actuators depends upon the number of threads per inch of the threaded valve stem. By use of a fine thread (many threads per inch) precise pressure control can be obtained since because of the large number of threads per inch, rotation of the valve stem can be effected to result in a small axial displacement of the valve plug. In contrast to this use of a fine thread for the threads of the valve stem is the use of a coarse thread (fewer threads per inch). By rotation of the valve stem with a coarse thread, only gross pressure control can be obtained, since because of the fewer number of threads per inch rotation of the valve stem results in a larger axial displacement of the valve plug.

Besides this limitation as to the amount of pressure control that can be effected from the aforementioned choice of threads is the fact that said choice of threads also effects the convenience by which said valve can be operated. The choice of a fine thread requires that the actuator be rotated many times for any substantial axial displacement of the valve plug stem while the choice of a coarse thread only requires a few rotations of the actuator for the same degree of axial displacement.

A further consequence of this choice as to a coarse or a fine thread in the design of the valve actuator is the ability to tightly seat the valve plug. The extent to which valve shufoff or complete pressure loss within a system can be effectuated depends upon the extent to which the valve plug can be tightly seated onto the valve seat port. Shufoff force is a direct function of the choice of the thread size for the valve stem threads. A fine thread size provides the greatest mechanical advantages and would allow a large seating force except that, by its design, the fine thread only allows for a relatively small force to be exerted to seat the valve plug. While a coarse thread size, because of its thread design, allows for a larger seating force to be exerted, but lacks the mechanical advantages of the fine thread.

In selection of a valve actuator, concern for the nature of the fluid that is to be controlled exists because of the intensive contact relationship between the valve plug and the valve seat. With mechanical screw actuators the valve plug is either rotated until tightly seated onto the valve seat or as in handwheel type of valves the valve plug is axially seated onto the valve seat. The effect of this contact rotation or axial seating is the progressive uneven wear of the valve seat or the valve plug or both. In addition, in those applications where the fluid in the system has an abrasive component the wear of the valve seat or plug due to the rotational or axial grinding of the valve plug on the valve seat is even more pronounced.

SUMMARY OF THE INVENTION

It is an object of this invention to provide a dual valve plug actuator device wherein said actuating device allows for both the coarse and fine movement of the valve plug. This coarse and fine valve plug movement allows for both the rapid positioning of the valve plug by turning the stem while permitting within the same valve the precise control of the valve plug, by turning the actuator nut while the stem is prevented from turning.

It is a further object of this invention to provide a dual valve plug actuator device wherein said actuating device has, in addition to the ability to deliver a seating force relative to the threads of the valve stem alone, the ability to deliver a greater seating force relative to the magnitude of the multiplication of the internal and external threads of an actuator nut.

Additionally, it is an object of this invention to provide a dual valve plug actuating device wherein the rotation of one actuator allows for both the rotational movement and seating of said valve plug onto the valve seat and wherein the rotation of the second actuator allows for the vertical or axial movement and seating of said valve plug onto the valve seat.

Briefly, a valve made in accordance with this invention has a body and a valve stem that passes through the wall of said body and that is arranged to be moved in and out. Attached to said body and surrounding the valve stem and actuator nut is a valve stem actuator mounting member which has an internal thread of a first predetermined number of threads per inch. Interengaged with the threads of this mounting member is an internally and externally threaded actuator nut. The external threads of this actuator nut are of the same first predetermined number of threads per inch as the mounting member while the internal threads are of second predetermined number of threads per inch. Threaded through said internal threads of the actuator nut is a threaded valve stem whose threads are of the same second predetermined value.

When it is desired to seat the valve plug onto the valve seat, this can now also be effected through either of two mechanisms. The rotation of the valve plug stem, causes the valve plug to be seated onto the valve seat by a force equal to the product of the mechanical advantage of the thread of the valve plug stem and the torque exerted in the rotation of the valve plug stem through said threads. If additional shufoff force is desired, this force can be obtained by rotation of the actuator nut. The rotation of the actuator nut causes a force to be exerted equal to the product of the mechanical advantage of effective theads per inch of the actuator nut and the applied torque, where the effective threads per inch (Tc) of the nut is defined by: $Tc = T_1 \times T_2/T_2 - T_1$, with $T_1$ being the value of the first predetermined number of threads per inch and $T_2$ being the value of the second predetermined number of threads per inch.

BRIEF DESCRIPTION OF THE DRAWING

The object and advantages of this invention, will become apparent from the reading of the following detailed description along with the accompanying drawing which is a partial vertical section of a plug type valve incorporating the invention.

DESCRIPTION OF THE PREFERRED EMBODIMENT

The valve illustrated in the FIGURE is generally described as a plug type valve and there is illustrated in particular a 90° angle valve having typically a cast steel body 10. The body has a packing plan opening 12 through which passes a valve stem 14 in fluid type relationship. Fluid ports 16 and 18 are in the body 10 and said ports are separated by a valve seat 22 where the valve plug 20 is arranged to engage and seat on the annular valve seat 22. Conventionally the plug 20 has a conically shaped replaceable trim 20A which matingly engages a similarly shaped seat 22.

The invention is especially directed to the need for moving the valve stem 14 and plug 20 relative to the valve body. Thus, there is a valve stem actuator mounting member 24 attached by any conventional means to the upper part of the valve body 10 which is formed so that there is an opening 26 through which the upper portion of the valve stem 14 passes. Within that opening is an actuator nut 28 that surrounds the stem 14. The nut 28 is engaged with the opening 26 of the member 24 by threads 28A on the nut and 26A on the opening 26. In the preferred embodiment the threads are predetermined to be eight threads per inch and a handle 28B is attached to the nut so that the nut may be turned and thereby moved vertically relative to the stationary valve body.

The nut 28 has its internal opening 30 surrounding the stem 14 and is engaged therewith by threads 30A on the nut and 14A on the upper portion of the stem. Typically the stem 14 has an operating handle 32 to cause rotation of the stem and thus induce vertical movement of the valve plug 20. In the preferred embodiment the threads 30A and 14A would be predetermined to be six threads per inch, although the man in the art can utilize any other predetermined thread value, both in these threads and in the threads 26A and 28A, to achieve the desired vertical movement.

In the preferred embodiment as the number of threads per inch between the external threaded portion of the actuator nut and the actuator mounting member is eight threads per inch, and the number of threads between the upper valve stem and the internal threaded portion of the actuator nut is six threads per inch, then the valve plug 20 can be caused to move in accordance with the following reference. By turning the handle 32 the valve plug trim 20A is caused to move vertically relative to the opening of the valve seat 22 so as to obtain a gross or a relatively coarse control of the amount of fluid that is flowing through the valve. In addition the actuator nut 28 can now be rotated by the handle 28B and, because the threads 26A and 28A between the actuator nut 28 and mounting member 24 are of a greater number of threads per inch than the threads 30A and 14A, the degree of vertical movement caused by the actuator nut is more precise. Thus, in the field of valve control, it could be said that the actuator nut gives a vernier control of the flow rate through the valve.

In addition if it is desired to tightly seat the valve plug 20 onto the valve seat 22 then after the valve plug has been seated by rotation of the valve stem 14 then by rotation of the actuator nut 28 the valve plug can be further tightened onto the valve seat by the multiplicative $(8 \times 6 \div 2)$ mechanical advantage of both the threads.

It can be seen that another advantage of this enhancement is that by moving the actuator nut 28, with the valve stem stationary, the position of the valve trim relative to the seat can be very carefully controlled. With the valve shutoff, the valve plug 20 may be lifted by the actuator nut 28 from the seat 22 without the rotational grinding which would occur between the valve trim 20A and the seat 22 by the rotational lifting by the turning of the valve stem 14. This is of great importance where there may be uneven wear of the valve or where dirt is or may be trapped between the conical surface of the seat and the conical surface of the trim 20A.

Although the various features of the invention have been shown as implied to one embodiment of the invention, it will be evident to the man skilled in the art that changes may be made in many of the details and features thereof without departing from the principles of the invention.

What is claimed is:

1. In a valve having a body and a valve stem passing through the wall of said body and arranged to be moved in and out, the improvement comprising: a valve stem actuator mounting member attached to said body and surrounding said valve stem, and further having internal threads of a first predetermined number of threads per inch; an actuator nut having external threads corresponding to said first predetermined value and arranged to interengage with said first named threads, said actuator nut having a passageway therethrough arranged to surround said stem and having threads therein of a second predetermined value; the exterior surface of said valve stem having thereon threads mating with those of said second predetermined value of the actuator nut whereby said stem may be caused to move in and out of said valve body both by rotating said actuator nut relative to said actuator mounting member and by rotating said valve stem relative to the internal threads of said nut to obtain both fine and gross control of the position of said valve stem.

2. A valve according to claim 1 wherein said first predetermined number of threads per inch for the threads of the valve body mounting member and the interengaged external threads of the actuator nut is greater than said second predetermined number of threads per inch for the internal threads of the actuator nut and the mating threads of the valve plug stem.

3. A valve according to claim 1 wherein said first predetermined number of threads per inch for the threads of the valve body mounting member and the interengaged external threads of the actuator nut is less than said second predetermined number of threads per inch for the internal threads of the actuator nut and the mating threads of the valve plug stem.

4. In a valve having a body with an inlet and outlet port and a valve seat located in a cavity between said inlet and outlet ports and a valve stem passing through the wall of said body and arranged to be moved in and out, the improvement comprising: a valve stem actuator mounting member attached to said body and surrounding said valve stem, and further having internal threads of a first predetermined number of threads per inch; an actuator nut having external threads corresponding to said first predetermined value and arranged to interengage with said first named threads, said actuator nut having a passageway therethrough arranged to surround said stem and having threads therein of a second predetermined value; the exterior surface of said valve stem having thereon threads mating with those of said second predetermined value of the actuator nut whereby said stem may be caused to move in and out of said valve body and to seat the valve plug onto the valve seat both by rotating said actuator nut relative to said actuator mounting member and by rotating said valve stem relative to the internal threads of said nut to obtain both fine and gross control of the position of said valve stem.

5. A valve according to claim 4 wherein said first predetermined number of threads per inch for the threads of the valve body mounting member and the interengaged external threads of the actuator nut is greater than said second predetermined number of threads per inch for the internal threads of the actuator nut and the mating threads of the valve plug stem.

6. A valve according to claim 4 wherein said first predetermined number of threads per inch for the threads of the valve body mounting member and the interengaged external threads of the actuator nut is less than said second predetermined number of threads per inch for the internal threads of the actuator nut and the mating threads of the valve plug stem.

7. In a valve having a body and a valve stem passing through the wall of said body and arranged to be moved in and out, a valve stem actuator mounting member attached to said body and surrounding said valve stem, and further having internal threads of a first predetermined number of threads per inch; an actuator nut having external threads corresponding to said first predetermined value and arranged to interengage with said first named threads, said actuator nut having a passageway therethrough arranged to surround said stem and having threads therein of a second predetermined value; the exterior surface of said valve stem having thereon threads mating with those of said second predetermined value of the actuator nut, whereby said stem may be caused to move in and out of said valve body both by rotating said actuator nut relative to said actuator mounting member and by rotating said valve stem relative to the internal threads of said nut to obtain both fine and gross control of the position of said valve stem, the method comprising:
(1) rotating the valve plug stem while keeping stationary the internally threaded actuator nut to move a predetermined distance and stopping and then
(2) rotating the actuator nut while keeping stationary the valve stem to move the valve stem a second predetermined distance.

8. The method of claim 7 in which the rotation of said actuator nut achieves one of a fine and a gross movement per turn and in which rotation of said valve stem achieves the other of said movement.

* * * * *